# 3,791,936
METHOD AND APPARATUS FOR MONITORING THE TOTAL COMBUSTIBLES AND OXYGEN CONTENT OF A GAS

Alfred Pebler and William M. Hickam, Pittsburgh, Pa., assignors to Westinghouse Electric Corporation, Pittsburgh, Pa.
Filed Aug. 20, 1971, Ser. No. 173,490
Int. Cl. G01n 27/46
U.S. Cl. 204—1 T                                5 Claims

ABSTRACT OF THE DISCLOSURE

The invention pertains to a technique for monitoring both the oxygen and combustibles content of a gas mixture regardless of excess oxygen or excess fuel conditions. The technique comprises the utilization of a catalytic combustion sensor and a solid electrolyte oxygen cell assembly. A catalytic thermopile sensing element causes a reaction to occur between the oxygen and combustible constituents of the gas mixture resulting in depletion of the constituent of lesser quantity and generating an electrical indication of the quantity of the minor constituent. The gaseous mixture is subsequently monitored by the solid electrolyte oxygen cell assembly, which generates an electrical output signal indicative of the excess oxygen or excess combustibles remaining in the gas mixture after the reaction produced by the catalytic thermopile sensing element. Under excess fuel conditions, the solid electrolyte oxygen cell assembly generates a signal which functions to introduce oxygen into the gas mixture in an amount to insure complete combustion. Manipulation of the electrical output signal from the catalytic thermopile sensing element and the electrical output signal of the solid electrolyte oxygen cell assembly by suitable monitoring circuitry provides electrical output signals indicative of both the oxygen and combustibles content in the original gas mixture.

BACKGROUND OF THE INVENTION

Numerous instruments are commercially available for monitoring oxygen and combustibles separately. The frequent simultaneous occurrence of both oxygen and combustibles in comparable amounts establishes a need for a device capable of monitoring combustibles and oxygen in mixtures exhibiting either excess oxygen or excess fuel concentrations. Typical examples of a requirement for such a device exists in the monitoring of the fuel and oxygen in the exhaust from industrial furnaces and internal combustion engines.

Currently employed on-line oxygen analyzers can be classed as either of a paramagnetic type, a wet polarographic type, or an oxygen conducting solid electrolyte type. Commercially available combustion meters generally employ a temperature sensitive device that monitors the heat effect from catalytic-heterogeneous combustion of fuels with oxygen. The most common technique utilized in combustion meters employs a resistance heater platinum wire or filament which exhibits a change in electrical resistance as a function of combustion. The combination of a commercially available combustion meter and a commercially available oxygen analyzer can presumably function to furnish combustibles-oxygen analysis of a gas mixture only under the conditions where excess oxygen is present in order to assure complete combustion of the fuel. If an excess combustibles condition exists, analysis of combustibles and oxygen by this combination of commercially available instruments is not possible since the combustion meter will generate a signal indicative of the amount of combustibles which can be combusted with the available oxygen and does not provide indication of the actual combustible content of the mixture. It is the intent of this invention to provide a technique for monitoring both oxygen and combustible content of gas mixtures under both excess oxygen and excess combustibles conditions.

SUMMARY OF THE INVENTION

A novel technique for monitoring and generating electrical indications of the oxygen and combustibles content of a gas mixture is described below in connection with an embodiment utilizing a catalytic combustion meter and a pair of solid electrolyte cell assemblies. A gas mixture, hereinafter referred to as the sample gas, containing both oxygen and combustibles is passed at a constant flow rate through a catalytic combustion sensor which generates an electrical signal indicative of the total combustibles content of the sample gas under excess oxygen conditions and the total oxygen content of the sample gas under excess combustibles conditions. The sample gas is then monitored by first and second solid electrolyte oxygen cell assemblies, the first of which functions as an oxygen titration cell and the second as an oxygen monitoring cell. The latter cell measures the equilibrium oxygen potential of the equilabrated sample gas. The oxygen monitoring cell generates an electrical output signal indicative of either oxygen rich or a fuel rich condition of the sample gas. If the sample gas contains excess oxygen relative to a predetermined set point or value, the oxygen monitoring cell measures the oxygen remaining after complete combustion and generates an electrical output signal indicative thereof. If however, excess fuel is present in the sample gas, the oxygen monitoring cell will generate an electrical signal which is applied to the oxygen titration cell as a feedback signal, to initiate the introduction of oxygen into the flow of sample gas in an amount to insure complete combustion. Under these conditions, the oxygen monitoring cells functions to monitor the oxygen titration operation and through suitable feedback circuitry functions to terminate the oxygen titration process when the set point value is reached. Electrical signals developed by the combustion sensor, the oxygen titration cell and the oxygen monitoring cell are processed by suitable circuitry to provide measurement of the oxygen and combustibles content of the sample gas.

DESCRIPTION OF THE DRAWINGS

The invention will become more readily apparent from the following exemplary description in connection with the accompanying drawings which include.

DESCRIPTION OF THE PREFERRED EMBODIMENT

Figure 1:
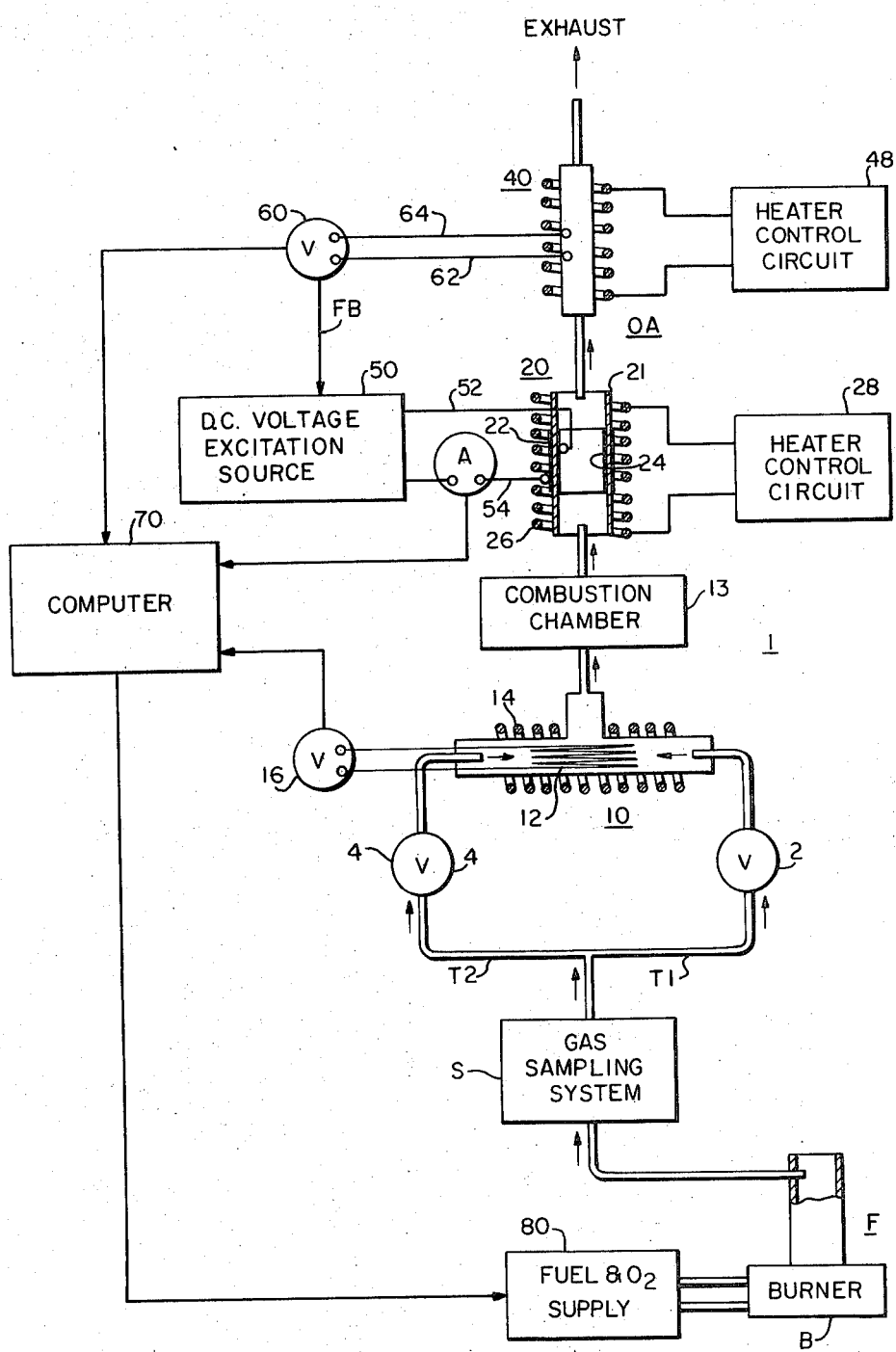
FIG. 1 is a block diagram schematic of an embodiment of the invention.

Referring to FIG. 1 there is illustrated schematically an integral combustible and oxygen analyzer apparatus 1 comprising combustion meter 10, solid electrolyte oxygen titration cell 20 and solid electrolyte oxygen monitoring cell 40 for monitoring the oxygen and combustible concentration of a sample gas derived from furnace flue F by gas sampling system S. The sample gas, which is divided equally through gas tubing T1 and T2 is supplied in a counter flow pattern to opposite ends of the combustion sensor 10 at a substantially constant flow rate by flow controllers 2 and 4. The combustion sensor 10 includes a catalytic thermopile sensing element 12 and a heater element 14. The catalytic thermopile sensing element 12 responds to the heat released from the catalytic-heterogeneous reaction between the combustible and oxygen of the sample gas by generating EMF an electrical signal which is monitored by the voltage measuring circuit 16. The heater element 14 maintains a suitable temperature to assure the desired reaction. The signal monitored by the voltage measuring circuit 16 is indicative of the total content of the minority constituent of the sample gas. For example, this signal is indicative of the total combustibles content of the sample gas of an oxygen rich sample gas, i.e. excess oxygen, and is indicative of the total oxygen content of the sample gas if the sample gas is fuel rich, i.e. excess combustibles.

Figure 2:
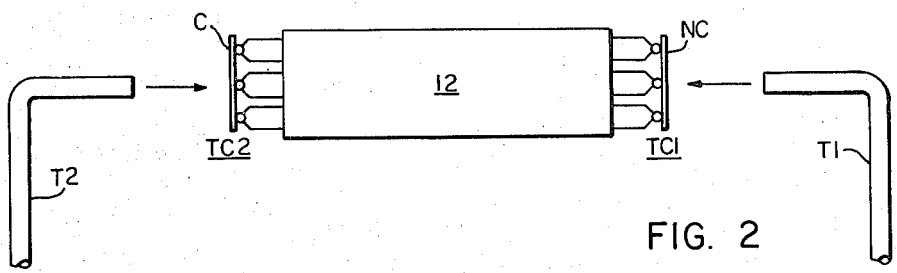
FIG. 2 is an illustration of a particular differential thermopile element for use with the combustion meter of FIG. 1.

A particularly desirable version of the catalytic thermopile sensing element 12 is illustrated in FIG. 2. It is comprised of two groups of series connected thermocouples TC1 and TC2, typically platinum-platinum/rhodium, disposed at either end of a cylindrical configuration and exposed to the split sample gas flow pattern established in tubes T1 and T2, respectively. The junctions of the thermocouples comprising group TC1 are coated with a layer of non-catalytic material NC such as a ceramic, while the junction of the thermocouples comprising group TC2 are coated with a layer of catalytic material C such as platinum. The catalytic coating C provides a significant reaction area and assures optimum reaction between the constituents of that portion of the sample gas diverted through tube T2. The utilization of the non-catalytic coating NC for minimizing the reaction between the constituents of the portion of the sample gas flowing in tube T1 establishes this portion of the sample gas as a reference. This reference enhances the relative magnitude of the signal produced by the reaction of the surface of the catalytic coating C.

Figure 3:
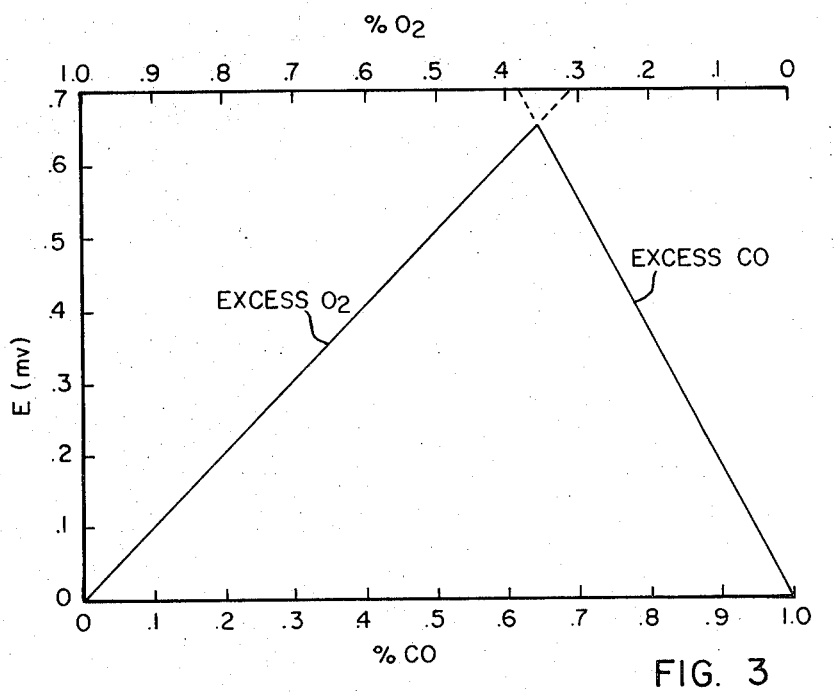
FIG. 3 is a graphical illustration of the operation of the combustion meter of FIG. 2 in various mixtures of $CO/O_2/N_2$.

The electrical output of the catalytic thermopile sensing element 12 for various $CO/O_2/N_2$ mixtures is graphically illustrated in FIG. 3.

Following the reaction within the combustion sensor 10, the sample gas is directed through an oxygen analyzer assembly OA comprising a solid electrolyte oxygen titration cell assembly 20, which functions to equilibrate the sample gas by causing complete reaction of the constituents of the portion of the sample gas flowing in tube T1, and a solid electrolyte oxygen monitoring cell assembly 40. A combustion chamber 13, positioned between the sensing element 12 and the cell 20 could be utilized to insure reaction of the sample gas flowing in tube T1.

The solid electrolyte oxygen titration cell assembly 20 is comprised of an open ended tubular solid electrolyte 21 composed of a material exhibiting significant oxygen ion conductivity and negligible electronic conductivity and an outer electronically conductive electrode 22 and an inner electronically conductive electrode 24. Solid electrolyte compositions exhibiting desirable oxygen ion conductivity are disclosed and described in detail in U.S. Pat. No. 3,400,054, issued Sept. 3, 1968 to Ruka et al. and assigned to the assignee of the present invention. The open ended tubular configuration of the solid electrolyte and the position of the inner and outer electrodes, which are typically platinum, is illustrated and described in U.S. Pat. 3,347,767, issued Oct. 17, 1967 to W. M. Hickam and assigned to the assignee of the present invention. The electrodes 22 and 24 are in the form of thin layers disposed in intimate contact with the electrolyte surface. It is necessary that the electrode material, in addition to exhibiting high electrical conductivity, support the diffusion of oxygen ions as well as being suitable for operation within the typical solid electrolyte oxygen cell operating temperature range 600° C.–900° C.

Electrical heater 26 is disposed about the solid electrolyte oxygen titration cell assembly 20 to maintain the cell assemby 20 at desired operating temperature in response to the heater control circuit 28. The composition and configuration of the solid electrolyte oxygen monitoring cell 40 is identical to that of the solid electrolyte oxygen titration cell assembly 20 and therefore will not be described in detail. The oxygen monitoring cell assembly 40 is maintained at the desired operating temperature by heater element 46 and heater circuit control 48. The solid electrolyte monitoring cell assembly 40, the operation of which is described in detail in the above-identified U.S. patents, functions as a galvanic cell by developing an EMF as a function of the difference in the oxygen concentration between the sample gas which flows across the inner electrode and an oxygen reference media of known oxygen concentration, such as air, which is in contact with the outer electrode. The EMF generated between the electrodes of the cell assembly 40 is transmitted by electrical lead members 62 and 64 to voltage measuring circuit 60. In the event the sample gas is oxygen rich thus resulting in the presence of oxygen after reactions in the combustion sensor 10 and cell assembly 20 the EMF measured by the EMF measuring circuit 60 is representative of the excess oxygen in the sample gas. Typical EMF measurements for excess oxygen conditions are in the range of 0–200 mv. If, however, the sample gas is combustibles rich thereby resulting in the depletion of oxygen in the sample gas during the reactions the oxygen differential across the solid electrolyte of the oxygen monitoring cell 40 is considerably greater than exists under excess oxygen condition and results in the generation of an EMF typically in excess of 800 mv. The transition between fuel rich sample gas and oxygen rich sample gas is accompanied by an abrupt change in the EMF output of the monitoring cell 40 between values exceeding 800 mv. and values less than 200 mv.

In the event the EMF generated by the solid electrolyte oxygen monitoring cell 40 is of a magnitude exceeding a predetermined set point value chosen between 200 mv. and 800 mv. indicative of a combustibles rich condition a feedback excitation signal FB is transmitted from the EMF measuring circuit 60 to a DC voltage excitation circuit 50 which in turn responds to the feedback signal FB by applying a DC potential across electrical leads 52 and 54 which are operatively connected to the inner and outer electrodes 22 and 24 respectively of cell assembly 20. The magnitude of the potential is proportional to the difference between the EMF generated by the monitoring cell 40 and the set point value. The polarity of the DC voltage applied across the electrodes 22 and 24 of the oxygen titration cell assembly 20 establishes a flow of oxygen from the oxygen reference media into the sample gas flow. This oxygen pumping action continues until the oxygen content of the sample gas as measured by the oxygen monitoring cell assembly 40 is sufficient to establish a predetermined relationship between combustibles and oxygen such as that required to insure complete combustion. When complete combustion is achieved, the current measured by ammeter A is a direct measure of the excess combustibles in the sample gas.

The operation of solid electrolyte oxygen cell as an oxygen pump is disclosed and described in detail in pending U.S. application Ser. No. 876,791, filed Nov. 14, 1969 by William M. Hickam and Robert Witkowski, entitled "Oxygen Control and Measuring Apparatus" and assigned to the assignee of the present invention, now U.S. Pat. No. 3,650,934. This pending application likewise illustrates the tubular oxygen cell configuration of FIG. 1 and further discloses the application of two sets of electrodes on a common tubular electrolyte member to form an integral dual oxygen cell assembly. This configuration would be applicable for implementation of this invention.

Electrical output signal from the combustion sensor 10 indicative of the total content of the minority constituent of the sample gas, electrical output signal of the oxygen monitoring cell assembly 40 indicative of excess oxygen and the current measurement indicative of excess fuel are coupled through a computer circuit 70 to provide measurements of the total oxygen and combustibles content of the sample gas. These measurements in turn are utilized to control a fuel-oxygen supply system 80 in order to obtain a desired fuel-oxygen ratio in a burner B of furnace F.

What is claimed is:

1. Apparatus for measuring combustibles and oxygen constituents of a gas, comprising,
   catalytic combustion means for producing a combustion reaction between said combustibles and said oxygen constituents to substantially deplete the minor constituent and generate a first electrical signal indicative of the quantity of said minor constituent,
   first solid electrolyte electrochemical cell means for monitoring said gas following said reaction and generating a second electrical signal indicative of excess oxygen as the major constituent in the event the quantity of said oxygen constituent exceeds the quantity of said combustibles constituent, and generating a third electrical signal indicative of excess combustibles as the major constituent in the event the quantity of said combustibles constituent exceeds the quantity of said oxygen constituent,
   second solid electrolyte electrochemical cell means operating as an oxygen ion pump and responding to said third electrical signal to introduce oxygen into said gas following said reaction in an amount sufficient to establish a predetermined relationship between the quantities of said combustibles and oxygen constituents as monitored by said first solid electrolyte electrochemical cell means,
   said second solid electrolyte electrochemical cell means generating a fourth electrical signal indicative of the quantity of oxygen introduced into said gas, and
   signal analyzing means responding to said first, second and fourth electrical signals to develop electrical signals indicative of the total oxygen and total combustibles present in said gas prior to said reaction.

2. Apparatus as claimed in claim 1, further including means for dividing the flow of said gas prior to said reaction into a first and a second gas flow, said first and second gas flows being supplied in a counter-flow pattern to said catalytic combustion means, said catalytic combustion means comprising a catalytic thermopile device having a catalytic surface exposed to said first gas flow and a non-catalytic surface exposed to said second gas flow, said reaction occurring at said catalytic surface.

3. Apparatus as claimed in claim 2 wherein said catalytic combustion means includes a first set of thermocouple junctions disposed in a plane substantially perpendicular to the flow of said first gas flow, said thermocouple junctions being coated with a catalytic material to form said catalytic surface, and a second set of thermocouple junctions disposed in a plane substantially perpendicular to the flow of said second gas flow, said second thermocouple junctions being coated with a non-catalytic material to form said non-catalytic surface.

4. Apparatus as claimed in claim 1 including a feedback circuit means operatively coupling said first solid electrolyte electrochemical cell means and said second solid electrolyte electrochemical cell means for applying a DC potential to said second solid electrolyte electrochemical cell means in response to said third electrical signal to establish said second solid electrolyte electrochemical cell means to operate as an oxygen pump.

5. A method for measuring the combustibles and oxygen constituents of a gas, comprising the steps of,
   producing a reaction between said combustibles and said oxygen constituents to substantially deplete the minor constituent and generate a first electrical signal indicative of the quantity of the minor constituent,
   monitoring said gas following said reaction and generating a second electrical signal indicative of excess oxygen as a major constituent in the event the quantity of said oxygen constituent exceeds the quantity of said combustibles constituent and a third electrical signal indicative of excess combustibles as the major constituent in the event the quantity of said combustibles constituent exceeds the quantity of said oxygen constituent,
   introducing oxygen into said gas following said reaction in response to the occurrence of said third electrical signal to establish a predetermined relationship between the quantities of said combustibles and oxygen constituents and generating a fourth electrical signal indicative of the quantity of oxygen introduced into said gas, and
   computing said first, second and fourth electrical signals to develop electrical signals indicative of the total oxygen and total combustibles present in said gas prior to said reaction.

References Cited

UNITED STATES PATENTS

| | | | |
|---|---|---|---|
| 3,514,377 | 5/1970 | Spacil et al. | 204—1 T |
| 3,597,345 | 8/1971 | Hickam et al. | 204—195 S |
| 3,442,773 | 5/1969 | Wilson | 204—1 T |
| 3,400,054 | 9/1968 | Ruka et al. | 204—195 S |

TA-HSUNG TUNG, Primary Examiner

U.S. Cl. X.R.

23—232 R, 253 PC, 254 R; 204—195 S